D. S. LANDSTRA.
METHOD FOR MOLDING PLASTIC MATERIALS.
APPLICATION FILED OCT. 5, 1918.

1,340,452. Patented May 18, 1920.

Dirk S. Landstra, Inventor:
By Russell M. Everett,
Attorney.

UNITED STATES PATENT OFFICE.

DIRK S. LANDSTRA, OF SOUTH ORANGE, NEW JERSEY.

METHOD FOR MOLDING PLASTIC MATERIALS.

1,340,452.

Specification of Letters Patent.

Patented May 18, 1920.

Application filed October 5, 1918. Serial No. 256,932.

*To all whom it may concern:*

Be it known that I, DIRK S. LANDSTRA, a citizen of the United States, and a resident of South Orange, in the county of Essex and State of New Jersey, have invented new and useful Improvements in Methods for Molding Plastic Materials, of which the following is a specification.

This invention relates more especially to the production of cement balls, such as are used in filtration plants and the like, although the invention might be employed for making balls from other plastic materials or indeed for the manufacture of other articles than balls from such material.

The objects of the invention are to secure rapidity, accuracy and uniformity in the making of cement balls; to secure solid homogeneous balls, which will stand hard usage and be durable; to secure simplicity, cheapness and ease of manufacture, and to obtain other advantages and results as may be brought out in the following description.

Referring to the accompanying drawings, in which like numerals of reference indicate the same parts throughout the several views.

Figure 1:
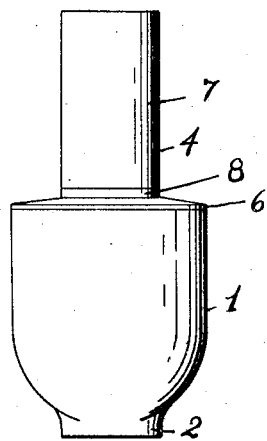
Figure 1 is a side elevation of the forming mold which is first employed in carrying out my invention.
Figure 2:
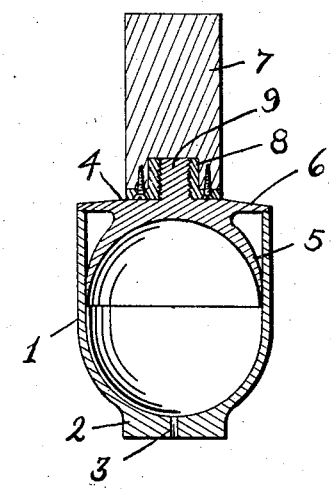
Fig. 2 is a central vertical section of the same.
Figure 3:
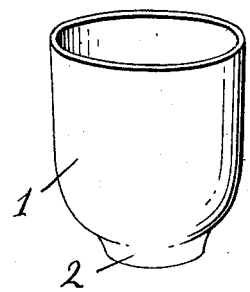
Fig. 3 is a perspective view of the lower or cup portion of the same.

In the specific embodiment of the invention set forth in said drawings, 1 indicates a cup-like forming mold which is adapted to stand upon any suitable support, such as a bench or the like, by means of a base 2 in which I have shown an air-vent hole 3. The lower half of the chamber of this mold 1 is semi-spherical or approximately of the shape desired to be given the balls, while the upper part is cylindrical and forms a guideway for a plunger or coöperative forming member 4. Preferably this upper cylindrical portion has a very slight flare, sufficient to afford clearance in removing the upper member 4 and also the oblong ball which is formed in the mold as hereinafter described.

This plunger 4 has a lower approximately semi-spherical portion 5 adapted to slidably enter the upper cylindrical part of the mold 1, and above said portion 5 is a flange or stop 6 adapted to engage the end of the mold 1 and limit entrance of the plunger member thereinto. Preferably said stop is so positioned as that the chamber formed by the mold and plunger will be somewhat spherical and elongated rather than exactly spherical and so mold a prolate spheroid. I have shown the plunger member 4 provided with a handle 7 of wood with a socket or bushing 8 to receive a threaded stem 9 on the lower middle portion, but obviously this construction could be varied as desired.

Figure 4:
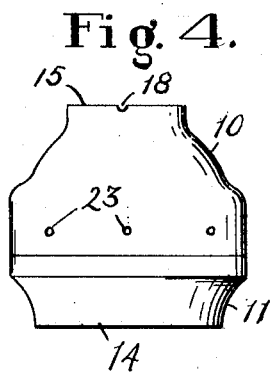
Fig. 4 is a side elevation of the shaping dies which are employed in finishing my improved balls.
Figure 5:
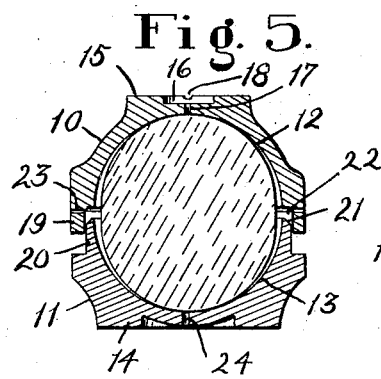
Fig. 5 is a central vertical section of the same with a ball inside as it comes from the forming mold and showing the shaping dies ready to be forced together.
Figure 6:
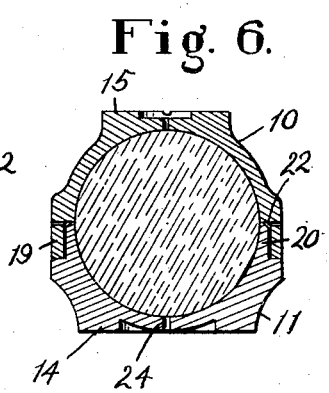
Fig. 6 is a similar section with the dies forced together, and the ball compressed into final shape.
Figure 7:
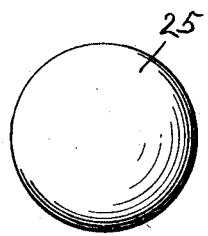
Fig. 7 is a perspective view of a ball made by my improved method and means.

The shaping dies shown in Figs. 4, 5 and 6 comprise upper and lower members 10 and 11 chambered at 12 and 13 respectively so as to form a sphere when pressed together. The lower die member 11 has a base 14 for standing upon a suitable bed and the upper die 10 has a top 15 adapted to receive the blows of a drop hammer. Preferably this top is centrally recessed as at 16 and provided with a vent 17 from its interior chamber and other lateral vents 18 leading to the atmosphere, so that when struck by the drop hammer the air can escape from the interior chamber and no air will trap in the recess 16.

The upper die member 10 has a flange 19 which slides down over an inner flange 20 on the lower die member at their plane of joining and these flanges are long enough so that they engage when the die members are loosely put together with an elongated ball of cement therein, as shown in Fig. 5. Under the blow of the drop hammer, the two die members come together as shown in Fig. 6, and preferably, for the escape of surplus material and the formation of smooth sides, the upper edge of the flange 20 of the lower die member is tapered inwardly as at 21 to a sharp edge, leaving an annular space 22 of triangular cross-section to receive any material which is forced out of the die chamber and cut off by the sharp edge. Furthermore vent holes 23 are provided opening from said annular space 22 through the flange 19 of the upper die member. There is also a vent 24 at the bottom of the lower die member.

In forming cement balls by my improved method, a suitable quantity of cement is first placed in the forming mold 1 and then the plunger 4 brought down on it, preferably with a blow or two of a mallet or the like, to set the stop 6 on the edges of the walls of the mold. The plunger member is then removed and the cement taken out in the form of an elongated ball or prolate spheroid such as shown in Fig. 5. This elongated ball is then placed between the shaping dies 10 and 11, with its major axis vertical, as shown in Fig. 5, and the dies are placed under a drop hammer. To make three inch balls, about two blows of a thirty-five pound hammer with a drop of six inches are sufficient to bring the upper and lower dies together, as shown in Fig. 6, and form a perfect ball 25. The die members are then separated, the ball taken out and any slight fin or line at the joint of the dies rubbed off with the hands, after which the balls are laid on a soft bed of sand. The balls are left there about eight hours, then submerged in water for at least twenty-four hours and if they remain in the water for as much as ten or twelve days it is all the better for Portland cement.

It will be understood that while I have described my invention with reference to the manufacture of cement balls, articles of other shapes can also be made according to my method, by changes in the means employed which would involve only mechanical skill, and the invention can be applied to any other plastic material than cement, for which it may be found suitable. Furthermore, while in making balls I prefer to first bring the material to the shape of a prolate spheroid or ellipsoid, it will be obvious that other shapes which may be described as elongated balls, such as ovoid, or approximate ovoidal or ellipsoidal, would serve the same purpose and could be used.

Having thus described the invention, what I claim is.

1. A process of making balls from plastic material which consists in first bringing the material to an elongated ball shape in one mold and then finishing it to its spherical shape in another mold.

2. A process of making balls from plastic material which consists in first bringing the material to an elongated ball shape in one mold and then finishing it to its spherical shape in another mold by pressure longitudinally of its major axis.

3. A process of making balls from plastic material which consists in first bringing the material to an ellipsoidal shape in one mold and then finishing it to its spherical shape in another mold.

4. A process of making balls from plastic material which consists in first bringing the material to an ellipsoidal shape in one mold and then finishing it to its spherical shape in another mold by pressure longitudinally of its major axis.

5. A process of making cement balls which consists in first bringing the cement to an ellipsoidal shape with its minor axis less than the diameter of the desired ball and its major axis greater than the diameter of the desired ball and then finishing it to its spherical shape in another mold by pressure longitudinally of its major axis.

DIRK S. LANDSTRA.